United States Patent [19]

Moschini

[11] 4,039,326
[45] Aug. 2, 1977

[54] ANTISCORIFIC POWDER FOR THE CASTING OF STEELS INTO INGOT MOLDS

[75] Inventor: Augusto Moschini, Piombino (Leghorn), Italy

[73] Assignee: Acciaierie di Piombino S.p.A., Italy

[21] Appl. No.: 668,407

[22] Filed: Mar. 19, 1976

[30] Foreign Application Priority Data

Apr. 17, 1975  Italy .................................. 12575/75

[51] Int. Cl.² ............................................... C22B 9/10
[52] U.S. Cl. ........................................... 75/257; 75/53
[58] Field of Search ....................... 75/94, 53; 148/26

[56] References Cited

U.S. PATENT DOCUMENTS

| | | | |
|---|---|---|---|
| 1,890,485 | 12/1932 | Amster | 75/53 |
| 2,823,112 | 2/1958 | Miller | 75/94 |
| 3,728,102 | 4/1973 | Buckingham | 75/94 |

*Primary Examiner*—Peter D. Rosenberg
*Attorney, Agent, or Firm*—Robert E. Burns; Emmanuel J. Lobato; Bruce L. Adams

[57] ABSTRACT

The invention has for its object an antiscorific powder to be used in casting "wild" or over-oxidized steels in an ingot moulds, so as to increase the slag fluidity. Said powder is easily obtained and of a relatively low cost.

2 Claims, No Drawings

ANTISCORIFIC POWDER FOR THE CASTING OF STEELS INTO INGOT MOLDS

BACKGROUND OF THE INVENTION

It is known that the presence of slag, gathering on the surface of the liquid metal bath after the casting wild steels in an ingot mold, causes a worsening in the physical characteristics of the material.

It is further known that the ideal solution would be that of removing the slag as soon as it gathers on the bath surface; however, that would have to be performed by an operator working in extremely bad conditions under the danger of the unavoidable wild splatters of the incandescent over oxidzed metal.

A solution that has been tried was that of modifying the characteristics of the slag fluidity, so as to render the slag more fluid and thus reduce to the minimum its drawing down into the liquid bath during the connection of the latter before its setting and the consequent incorporation of the slag inclusions inside the solidified ingot. However, such macroinclusions, worsen the mechanical characteristics of the plate obtained by rolling from such ingots.

OBJECT OF THE INVENTION

The invention has for its object to increase the slag fluidity through the addition of antiscorific powder to the poured steel in the mold. This powder is easy to obtain and is of relatively low cost.

SUMMARY OF THE INVENTION

The antiscorific powder for casting weld steels into an ingot mold according to the invention, consists of the following weight composition:

$SiO_2$: 0.5 – 2.0%
$CaF_2$: 40.0 – 60.0%
$Na_2CO_3$: 5.0 – 20.0%
borax : 2.0 – 12.0%
wood flour : 20.0 – 30.0%

Said antiscorific powder is further characterized in that only of 2-4 kgs is used for ingots weighing between 4 and 6 tons; of course, for ingots of higher or lower weight said quantity is correspondingly increased or decreased.

DESCRIPTION OF A PREFERRED EMBODIMENT

A wild steel intended to be rolled down to a low thickness for obtaining plates for deep drawing is to be cast in an ingot mold.

After the steel has been poured into the ingot mold, said antiscorific powder is added thereto, according to the invention, in a quantity up to 3 kgs per each ingot, presuming that the weight of the mold charge is of about five tons.

The composition of the antiscorific powder according to the invention is the following:

$CaF_2$: 49.5%
$Na_2CO_3$: 10.0%
borax: 10.0%
wood flour: 30.0%
$SiO_2$: 0.5%

The ingot mold is then covered in a conventional manner and the ingot is left to cool down. Then, still in a conventional manner, said ingot is rolled so as to obtain a plate band with a thickness of 0.7 mm. The macroinclusion rejects from the working of the cold drawn pieces obtained from said plate, were lower than 1%.

It is to be understood that the invention is not limited to the example shown. It is intended to cover all modifications and equivalents within the scope of the appended claims.

What we claim is:

1. An antiscorific powder composition for addition after the casting of liquid wild steels into an ingot mold, essentially consisting of the following weight % composition:

$SiO_2$: 0.5 to 2.0%
$CaF_2$: 40.0 to 60.0%
$Na_2Co_3$: 5.0 to 20.0%
Borax: 2.0 to 12.0%
Wood Flour: 20.0 to 30.0%

2. An antiscorific powder according to claim 1, wherein said powder in the proportion of 2-4 kgs for ingots weighing between 4 and 6 tons is added after pouring of said steel into the ingot mold.

* * * * *